Dec. 19, 1939.  M. HORNS  2,183,812
OIL HEATER
Filed May 20, 1938  2 Sheets-Sheet 1
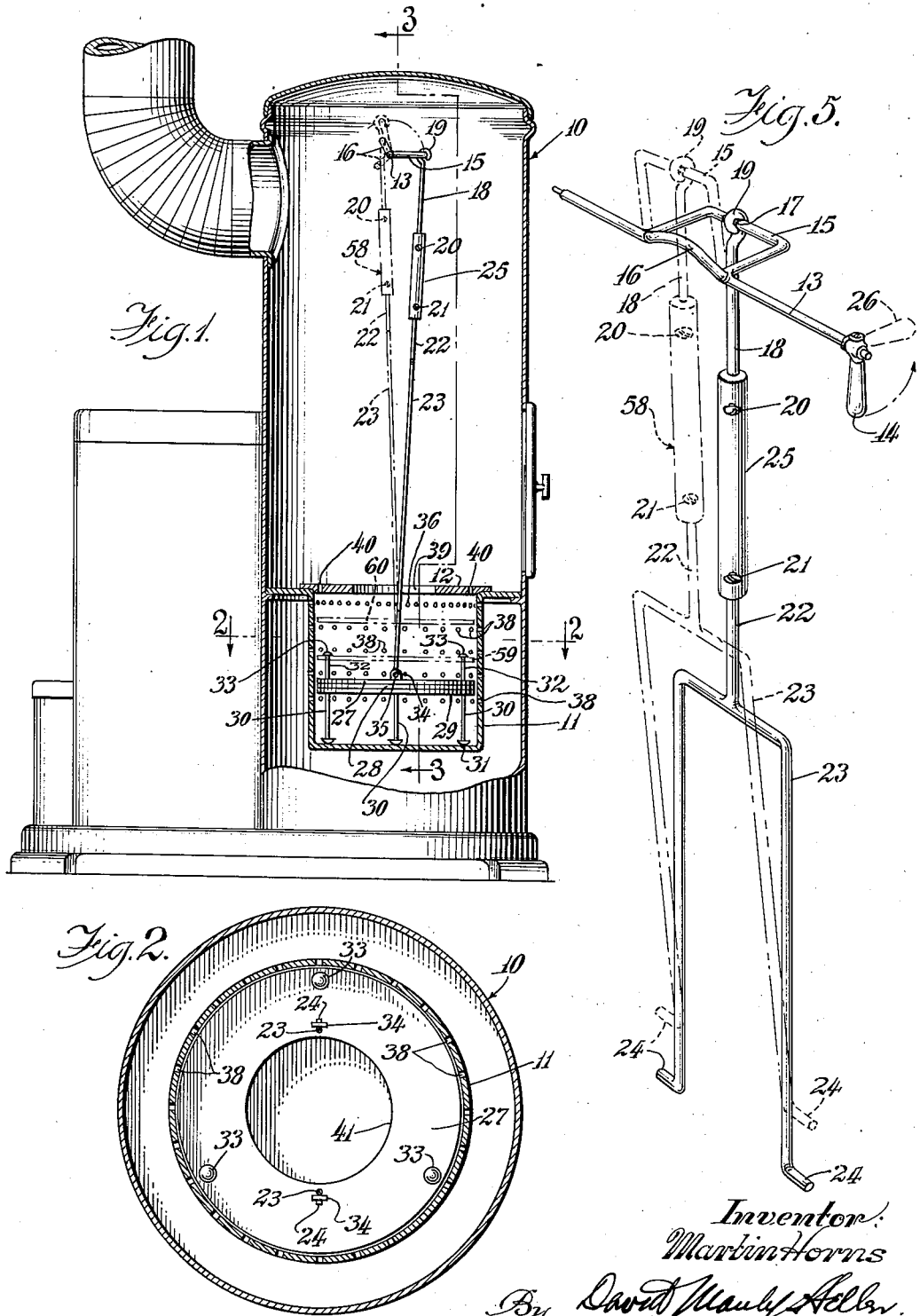
Inventor:
Martin Horns
By David Manly Heller
Attorney Dec. 19, 1939.  M. HORNS  2,183,812
OIL HEATER
Filed May 20, 1938   2 Sheets-Sheet 2
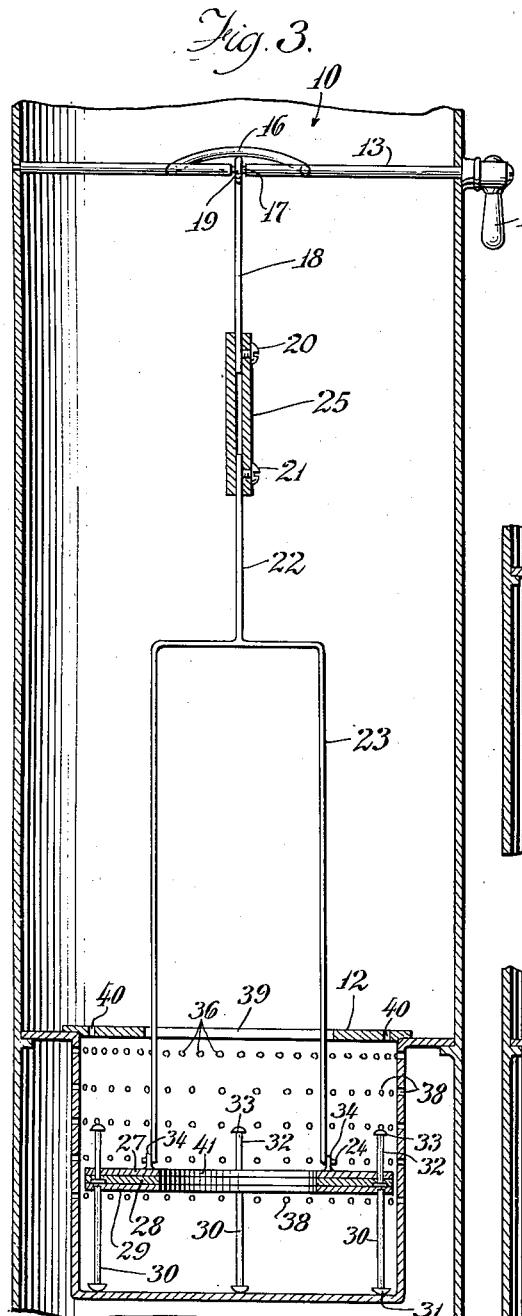
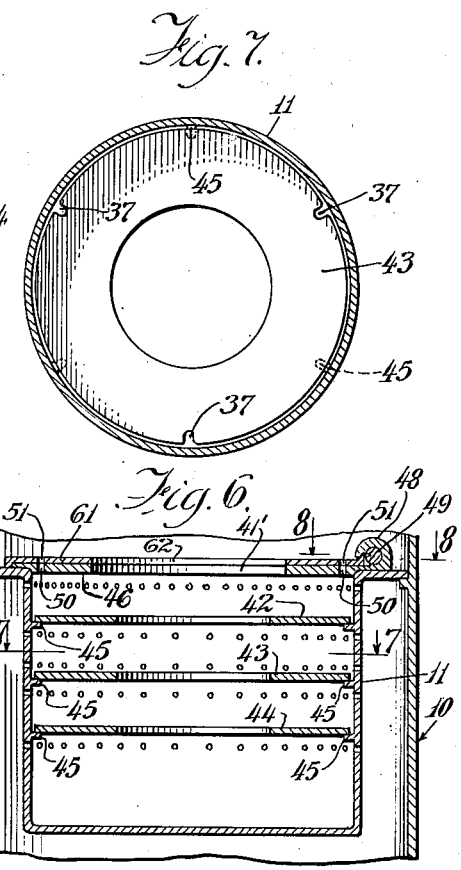
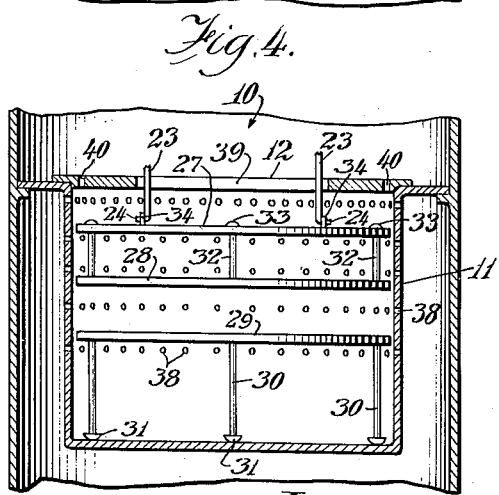
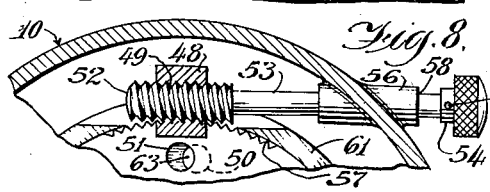

Patented Dec. 19, 1939

2,183,812

UNITED STATES PATENT OFFICE 2,183,812

OIL HEATER

Martin Horns, Chicago, Ill.

Application May 20, 1938, Serial No. 209,025

7 Claims. (Cl. 158—91)

This invention relates to a new and useful improvement in oil heaters in the form of a simple attachment or accessory which can be easily installed in a standard oil heater increasing its efficiency, and practically eliminating all smoke created during oxidation or combustion of the fuel oil consumed, and has for its primary object rendering such oil heaters practically smokeless.

Another object of the invention is the provision of a series of baffle plates which tends to make the oil heater smokeless.

A still further object of the invention is to provide an accessory with a series of baffle plates which either remain in a compact form rendering the oil burner operative under standard or normal conditions or can be adjusted to render the oil heater smokeless, said adjustment being made instantaneously by the action of the attachment or accessory which is the primary essence of my invention.

Another object of the invention is the provision of a top baffle plate which has a series of holes drilled in it and which is also arranged to vary and adjust an effective operative venting aperture or orifice thru a simple mechanical adjusting means.

Another object of the invention is to provide a simple, durable, practical, useful, and efficient accessory for the purpose described and which is also economical to manufacture.

Other objects will appear hereinafter from the description and claims, of the combination of parts illustrated.

The invention will be comprehended by reference to the accompanying drawings wherein like numerals will represent like parts and in which:

Fig. 1 represents a view of an oil heater partly in elevation and partly in cross-section, showing how the respective elements comprising my invention are attached thereto.

Fig. 2 is a transversal cross-sectional view on the line 2—2 of Figure 1.

Fig. 3 is a longitudinal cross-sectional view on the line 3—3 of Figure 1.

Fig. 4 is a partial longitudinal cross-sectional view similar to Figure 3 showing my invention in operative form or position.

Fig. 5 is an isometric view of the forked rod arrangement which is an essential part of the mechanism comprising my invention.

Fig. 6 is a partial longitudinal cross-sectional view showing my invention with the baffle plates in fixed relationship attached to the pot of a standard oil heater.

Fig. 7 is a transversal cross-sectional view on the line 7—7 of Figure 6.

Fig. 8 is a transversal cross-sectional view on the line 8—8 of Figure 6.

In the drawings at Figure 1 is illustrated a "pot type" oil burner generally designated by the numeral 10, that portion of it which is designated as the pot and numbered 11 is where the oxidation or combustion of the fuel oil consumed takes place. It will be noticed that this pot is of a circular structure and has a flange for a support within the said oil burner and has a series of perforations especially as shown and designated at 36, in the top row the perforations being more numerous than the perforations in the other four rows designated 38.

The standard pot of a standard burner has a baffle plate 12 having merely a large opening 39 in its center but without the holes designated at 40. My invention comprises a baffle plate designated by the numeral 29 and supported by 3 studs designated by 30 having hemispherically shaped heads 31 in order that the baffle plate 29 may rest on the bottom of the pot 11, as shown.

Resting on top of the baffle plate 29 is the baffle plate 28 which is similarly constructed and has secured thereto the studs 32 having hemispherical heads 33. These studs are of a predetermined length and fit into the baffle plate 27 adapted to slide by virtue of clearance holes over the stud 32 the purpose of which will hereinafter be explained.

All of the baffle plates 27, 28 and 29 have a large opening in the center designated generally by 41, in other words they are annular in shape. The baffle plate 27 has two lugs at right angles to its top surface designated by 34 which receive a springy forked member 23 the ends of which are angularly bent as at 24 to spring into place into the holes 35 of the said lugs 34, or to enable one to remove the fork member 23 by springing together the fork ends 24.

The forked member 23 has an extension 22 which slips into a slip bushing 25 and is secured thereto by set screw 21. This bushing 25 is a spacer attached to member 18 by set screw 20 and is for the purpose of affording vertical adjustment between the upper portion 18 of the mechanism herein described and the lower portion 22 giving it a variation or extension as may be found necessary when this attachment is put on any similar type of oil burner.

To proceed with the description of the mechanism it will be noticed that the rod 18 has an eye formed at its top end designated by 19 and fits on the crank member 13 having a crank extension 15 and the said eye 19 fits over a slight bead or filet in the center portion of the crank member 15 at a point 17 in order to provide a smooth working action for the eye member 19 when the said crank is rotated to the position indicated by the arrow. In order that the crank impart the correct or needed motion to the baffle plate members heretofore described, the eye 19 is located in this groove 17 to prevent it from moving sideways thereby avoiding distortion of motion to which the device is definitely to be confined.

It will be noticed that opposite to this crank portion 15 on the crank member 13 there is another extension arcuate in shape designated 16 at a definite angle to the plane of the portion 15 which is for the purpose of stopping motion when the handle member 14 is turned in the direction of the arrow to the dotted position 26, when the entire assembly assumes the position generally designated by the dotted structure shown at 58 in Figure 5, and it will be noticed that the angular relationship of the portion 16 is such, that when the fork 23 is moved to its uppermost position it is taken slightly past the dead center point thus assuring its remaining that way without dropping down unless it is desired so to do by the rotation of the manual control 14.

Referring to Figure 1, attention is also called to the dotted position of the assembly effected by virtue of the heretofore mentioned manual control 14 and it will be noticed that the two upper baffle plates referred to as 27 and 28 assume the position as indicated by the light lines shown at 59 and 60.

In this position, and it will be noticed that these positions have been calculated to be above the perforations 38 which arrangement or position has been found to give the most advantageous result.

As a further modification I have found that if I take the ordinary standard baffle plate 12 and drill therein a series of holes designated by 40 these holes being drilled around the circumference and within the internal diameter of the cavity of the pot member 11, the efficiency of the burner is greatly enhanced and eliminates smoking completely making it practically smokeless.

It seems that the vents 40 aid materially the oxidation and combustion of the fuel which is used for the purpose.

By referring to Figure 6, I show a modification of my invention wherein the plates are placed in a fixed position and can either be removed completely in order to bring the stove back to its normal condition and can be replaced therein at will, in other words this is not a collapsible arrangement like the one I have provided in Figures 1 and 3.

It will be noticed there that the plates designated by 42, 43 and 44 have small U-shaped openings designated by 37 which are for the purpose of clearing the upper lugs designated 45, which support the top plate 42, when it is desired to place the bottom plate 44 in the lowest position in the pot. The openings 37 aline with the respective supports 45 so that the plates will clear the supports 45 and the baffle plate 44 is rotated slightly in a position which no longer permits the openings 37 to be congruent with the lugs 45 and thereby permits it to remain supported on the said lug 45, the remaining baffle plates 43 and 42 also are placed in position in the same manner as plate 44, except that they have a higher relative position in the pot cavity.

It will be noticed in Figures 6 and 8 that the baffle plate which is designated 46 at one end has a boss 48 which is threaded with a threaded portion 49 in order to accommodate the screw thread 52 of the member 53 the member 53 being smaller in diameter than the root diameter of the thread in order to fit into a hole 58 of boss 56, this boss being part of the framework of the heater 10. The portion 53 is attached to a small knob 54 by virtue of the pin 55.

The top baffle plate 46 has resting thereupon an auxiliary baffle plate designated by 61 having a clearance hole in its center and which is perforated with a series of holes 51 on the same radius or diameter as the holes 50 are drilled in the baffle plate 46.

The baffle plate 61 as shown in Figure 8 has a series of teeth with the same type of thread and pitch to mesh with the male member 52 and the toothed portion 57 and extending in an arcuate relationship and for a distance equivalent to the travel of the screw member 52 permitting the holes 51 to register with the holes 50, in a position where they are absolutely congruent or in any other position where the two holes would overlap resulting in a restricted aperture 63 which is constricted, and provides a varied adjustment in the restriction of the vent holes 50 and 51 or if needed nullifies their function by rotating the knob portion 54 until it meets the front face of the boss member 56. A registering position of the holes 50 and 51 is obtainable when the threaded portion 52 recedes back until the shoulder of the thread strikes the inner face of the boss 56.

In Figure 4 is best illustrated the automatic collapsible arrangement I have provided in operative form and in the arrangement yielding the maximum efficiency and eliminating the smoke, soot and any other messy condition usually attributable to imperfect oxidation or combustion, of the type of fuel that is consumed in a heater of this kind.

It can be seen that my device can be easily installed in a standard type of heater affording to the heater normal operation which was originally intended, or in the improved manner, rather instantaneously placing it in either position, by virtue of the simple and practical mechanism provided. All that one has to do is operate the manual control 14, swing it to the position 26 and the heater is immediately placed in the position to operate in the most advantageous manner, or by restoring the normal position 14 as shown in Figure 5 and Figure 1 the heater remains unaffected and burns as the manufacturer originally intended it to work.

It seems to me from my observation and experience that the average standard type of burner did not take into consideration the provision of sufficient means for providing the oxygen necessary for perfect combustion and my vent holes and baffle plates structure help materially in producing this highly desirable and efficient result.

The heater under normal operation burns with a yellow flame having a black top fringe which is carbon or soot and the result of imperfect combustion, whereas with my device attached and the baffle plates in distended position, the heater burns with a bluish white flame, showing perfect combustion, and the resulting advantages of making no carbon deposit, which has to be cleaned often, and which condition if neglected further impairs the efficiency of a heater by the constriction of the "draft" cross-sectional area.

While I have illustrated and described preferred forms of my invention I do not wish to limit myself to the specific details of structure shown, but desire to avail myself of such variations and modifications as may come within the scope of the appended claims.

Having thus described my invention what I claim as new and desire to secure by Letters Patent is:

1. A device of the character described adapted for use with an oil burner, comprising a baffle plate structure made up of at least two baffle plates adapted to be collapsed or extended in a predetermined spaced relationship, and crank means mounted in the body of said oil burner connected to said baffle plate structure adapted to collapse or extend the said baffle plate structure in a predetermined spaced relationship.

2. A device of the character described adapted for use with an oil burner, comprising an intermediate baffle plate structure made up of at least two baffle plates adapted to be collapsed or extended in a predetermined spaced relationship, a vented top baffle plate resting on the top of the pot of said burner, and crank means mounted in the body of said oil burner, connected to said baffle plate structure and adapted to collapse or extend the said intermediate baffle plate structure in a predetermined spaced relationship.

3. A device of the character described adapted for use with an oil burner comprising, an intermediate baffle plate structure made up of at least two baffle plates adapted to be collapsed or extended in a predetermined spaced relationship, a vented top baffle plate provided with means for adjusting the vents of the said top baffle plate, said top baffle plate resting on the top of the pot of said oil burner, and crank means mounted in the body of said oil burner adapted to collapse or extend the said intermediate baffle plate structure in a predetermined spaced relationship.

4. A device of the character described adapted for use with an oil burner, comprising, a bottom baffle plate mounted within the pot of said oil burner at a distance from the bottom thereof, an intermediate baffle plate structure made up of at least two baffle plates, relatively mounted in slidable relationship with respect to each other and adapted to be collapsed or extended in a predetermined spaced relationship, and crank means mounted in the body of said oil burner adapted to collapse or extend the said intermediate baffle plate structure thus dividing the combustion chamber of the burner into several communicating combustion compartments.

5. A device of the character described adapted for use with an oil burner, comprising, a bottom baffle plate mounted within the pot of the said oil burner at a distance from the bottom thereof, an intermediate baffle plate structure made up of at least two baffle plates slidably mounted with respect to each other and adapted to be collapsed or extended in a predetermined spaced relationship, a vented top baffle plate provided with means for adjusting the vents of the said top baffle plate, said top baffle plate resting on the top of the pot of the said oil burner, and crank means mounted in the body of said oil burner adapted to collapse or extend the said intermediate baffle plate structure in a predetermined spaced relationship.

6. A device of the character described adapted for use with an oil burner, comprising, a baffle plate structure made up of at least two baffle plates, namely, an upper baffle plate and a lower baffle plate, said lower baffle plate, provided with headed studs mounted on its top surface, said upper baffle plate provided with clearance holes to engage slidably the headed studs of said lower baffle plate, said upper baffle plate also provided with ears, a bottom baffle plate mounted within the pot of said burner at a distance from the bottom thereof, crank means mounted in the body of said oil burner, and linkage means connecting the said crank means to the ears of the said upper baffle plate.

7. A device of the character described adapted for use with an oil burner, comprising, a baffle plate structure made up of at least two baffle plates, namely an upper baffle plate and a lower baffle plate, said lower baffle plate provided with headed studs mounted on its top surface, said upper baffle plate provided with clearance holes to engage slidably the headed studs of said lower baffle plate, said upper baffle plate also provided with ears, crank means rotatably mounted in the body of said oil burner having an outer extension to which a manipulating handle is attached, the said crank means provided with a bowed or arcuate stop portion at a slight angular relationship to the crank portion of the said crank means, and linkage means connecting the said crank means to the ears of the said upper baffle plate.

MARTIN HORNS.